Nov. 28, 1950     A. R. GRENFELL     2,531,908
RADIO NAVIGATIONAL AID

Filed July 28, 1947     4 Sheets-Sheet 1

INVENTOR
ALEXIS RENE GRENFELL
BY Walter P. Huntley
ATTORNEY

Nov. 28, 1950     A. R. GRENFELL     2,531,908
RADIO NAVIGATIONAL AID

Filed July 28, 1947            4 Sheets-Sheet 4

INVENTOR
ALEXIS RENE GRENFELL
BY
Walter P. Huntley
ATTORNEY

Patented Nov. 28, 1950

2,531,908

UNITED STATES PATENT OFFICE 2,531,908

RADIO NAVIGATIONAL AID

Alexis René Grenfell, Stanmore, England, assignor to The Decca Record Company Limited, London, England, a corporation of Great Britain Application July 28, 1947, Serial No. 764,155
In Great Britain August 12, 1946

7 Claims. (Cl. 343—105)

This invention relates to radio navigational aids and has particular reference to a lane identification system for use with radio frequency navigational systems.

In a co-pending application Serial Number 612,986 filed by William J. O'Brien on August 27, 1945 and assigned to the assignee of this application, there is described a lane identification system in which the identification is obtained by periodically altering the mode of operation of the transmitting equipment. In that application it is explained that the direct phase measurement type of navigational aid operates to indicate the geographical location of a mobile vehicle by measuring and indicating the multiple phase relations among a number of radio frequency signals of unlike but harmonically related frequencies radiated from a plurality of spaced points.

In order to achieve the requisite accuracy of indication, such a system is ordinarily operated with a considerable ambiguity, with the result that the same phase relation may be found in each of a considerable number of sectors or lanes (the term "lane" being employed to designate that sector-shaped area having a lateral width equal to 360 electrical degrees of phase displacement at the comparison frequency used in the system). In the normal operation of such a system the indicating device is provided with a register for counting and indicating the total of the number of lanes traversed during the motion of the vehicle so that if, at the time the system is placed in operation, the lane indicator is set manually to a reading corresponding to the then known location of the vehicle, the device will thereafter continue to indicate the correct lane and fraction thereof representative of the vehicle location regardless of the number of lanes crossed and regardless of the direction in which such crossings are made.

One of the disadvantages of such a system lies in the fact that under certain circumstances it is difficult to know the geographical location of the vehicle at the time the system comes into operation. This is particularly true in the case of long range ships or aircraft which come in to the operational field of the system from the outside. Under these circumstances the initial location of the vehicle is unknown and it is therefore impossible to set correctly the lane indicator.

In the above identified application it is explained that by periodically proportionately shifting the frequencies of all of the radiated signals there is produced at the receiving apparatus a phase shift, the magnitude of which varies progressively from lane to lane around the navigational pattern. By this means the navigator of the mobile vehicle may determine the lane passing through his position and so accordingly set the lane indicators. Thereafter the system operates in the normal fashion and gives continuous and correct indications.

The present invention is directed to an improvement of the system disclosed in the above identified co-pending application and provides a method and apparatus serving to give a continuous indication which identifies the lane and at the same time gives precise navigational data as to the position of the vehicle within the identified lane.

It is therefore an object of this invention to provide a radio navigational aid of the direct phase measurement type which produces a continuous identification of the sector or lane within which a mobile vehicle is located concurrently with a precise indication of the position of the vehicle within the identified lane.

It is another object of this invention to provide a navigational aid of the character set forth in the preceding paragraph in which the mode of operation of the transmitters is continuously alternated between two modes and which the receiving apparatus is operated in synchronism with said alternations.

It is also an object of this invention to provide a system of the character hereinbefore referred to in which the receiving equipment includes two sets of phase measuring apparatus together with a switching means for operatively energising said measuring apparatus alternately in synchronism with the alternate operation of the transmitting equipment.

It is a still further object of this invention to provide an apparatus of the character set forth hereinbefore in which the change in mode of transmitter operation consists in a proportional shift in all frequencies transmitted by an amount equivalent to a change of one half wave length in transmitter spacing.

Other objects and advantages of this invention will be apparent from a study of the following specification read in connection with the accompanying drawings, wherein.

Figure 1:
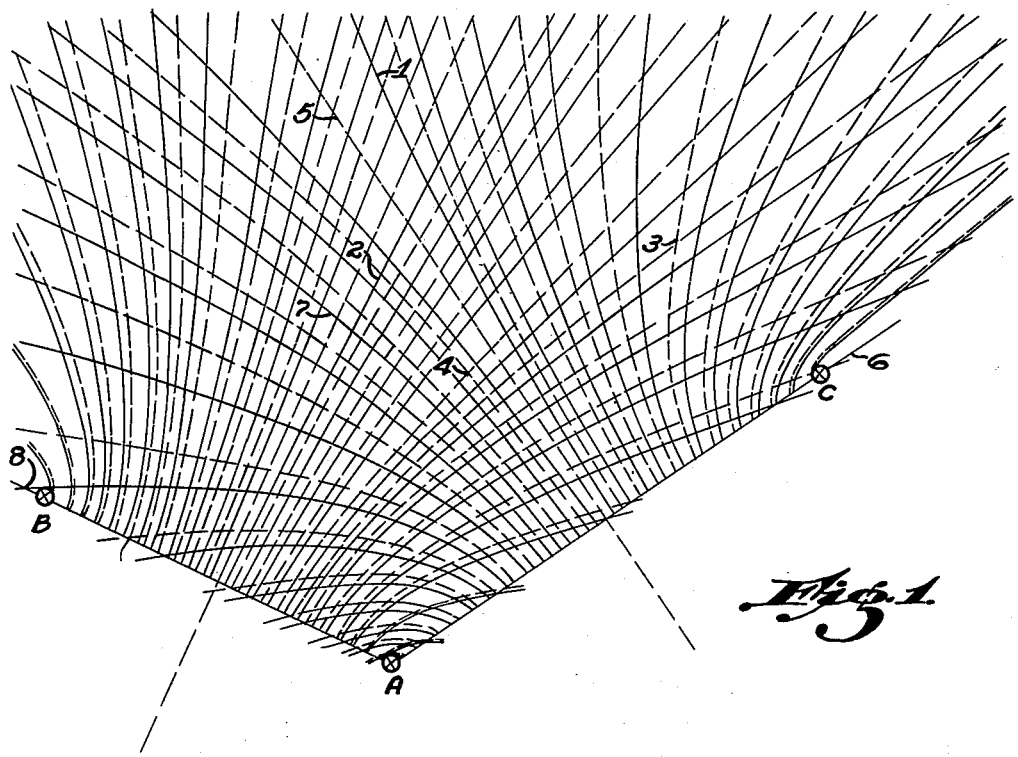
Figure 1 is a diagrammatic view illustrating the equi-phase displacement pattern produced by three radio frequency transmitters and illustrating by means of dashed lines an alternate pattern resulting from changing the mode of operation of the transmitters.

Referring to the drawings, I have illustrated in Figure 1 by means of the solid lines 1 and 2 the intersecting equi-phase displacement field patterns which may be obtained from three transmitters located for example, at locations A, B and C and operated at different but harmonically related frequencies and in a fixed multiple phase relation to each other.

For this purpose of illustration it may be assumed that transmitter A is operated at a frequency of 60 kc., transmitter B at a frequency of 80 kc., and transmitter C at a frequency of 90 kc. As will be explained hereinafter, the phase comparison between the signals from transmitters A and B is effected by converting both frequencies to a common reference frequency and measuring the phase relation between these two reference signals of like frequency. The comparison or reference frequency for the A and B transmissions would therefore be 240 kc. while the reference frequency for the A and C transmissions will be 180 kc. If locations A and B are spaced apart a distance of 150 kilometers and locations A and C are spaced apart a distance of 200 kilometers, there will be produced 240 individual lanes in each of the AB and AC patterns, each lane having a circumferential width of 360 electrical degrees at the corresponding comparison or reference frequency. In Figure 1, the lines 1 and 2 are representative of the lines along which a zero degree phase difference is measured between the refrence signals of each of the two sets. If the complete pattern were drawn there would be shown 240 of each of the lane boundary lines 1 and 2. However, for the purpose of clarity in the drawing only every tenth lane boundary line has been shown.

In Figure 1 the dashed lines 3 and 4 represent the field patterns resulting from proportionally changing the frequencies of each of the three transmitters by an amount necessary to reduce the spacing of each of transmitters B and C from transmitter A by one half wave length. This may be accomplished by operating transmitter A at a frequency of 59¾ kc., transmitter B at 79⅔ kc., and transmitter C at 89⅝ kc. At these frequencies the AB reference frequency is 239 kc. and the AC reference frequency is 179¼ kc. Each of the dashed line patterns 3 and 4 therefore embrace 239 full lanes and so distinguish from the 240 lanes characterising the solid line pattern. As is the case with the solid lines 1 and 2 the dashed lines 3 and 4 represent every tenth lane boundary.

From an inspection of Figure 1 it will be seen that in proceeding in a counterclockwise direction around transmitter C, the dashed line pattern appears at a gradually increasing distance from the solid line pattern until the perpendicular bisector 5 of the AC base line 6 is reached at which point the dashed line coincides with the bisector and lies mid-way between adjacent solid lines. As the rotation is continued the dashed lines gradually approach the solid lines next ahead until they coincide with the solid lines along the extension of the base line 6 beyond transmitter A. In the same way the dashed line pattern 4 leads the solid line pattern 2 until it coincides with the perpendicular bisector 7 of the base line 8 which extends between transmitters A and B.

It is apparent that the phase measurement made at a point located on the dashed line 5 will differ by 180 degrees as between measurements made during the radiation of the normal or solid line pattern and measurements made during the radiation of the alternate or dashed line pattern. Similarly at other points in the field the amount of shift measured between the normal and alternative modes of transmitter operation is proportional to the lane number for each lane assuming that the lane numbering is started at the point where the solid and dashed line patterns coincide (in the example illustrated the patterns coincide on the base lines 6 and 8).

The present invention is directed to a method of operating the transmitting apparatus to alternatively radiate the normal and alternative patterns and to a receiving apparatus for receiving these radiations and continuously indicating the lane identification as revealed by the phase difference between the two sets of signals of the receiver within the lane thus identified.

Figure 2:
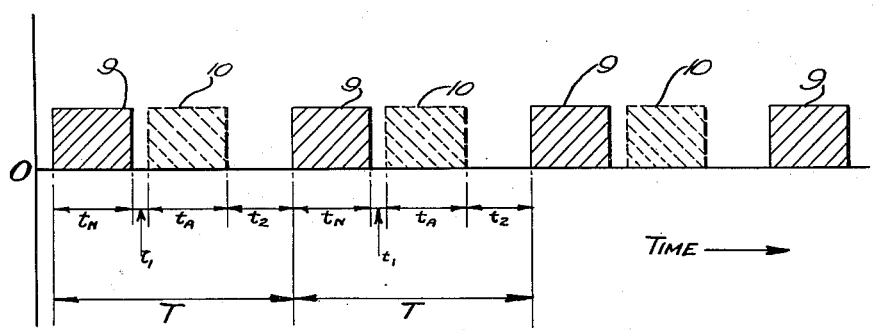
Figure 2 is a sequency diagram illustrating the time sequency characterising the alternating mode of operating the transmitting equipment.

In accordance with this invention the transmitting apparatus is operated alternately in accordance with a time sequence such as that represented in Figure 2. In Figure 2 the block areas 9 having a duration $t_N$ represent the normal mode of transmitter operation and the block areas 10 having a time duration $t_A$ represent the periods of operation of the transmitters according to the alternative mode. The change-over time from the normal to the alternative mode of operation indicated by the period $t_1$ is made short relative to the duration of transmitter operation, whereas the change over time $t_2$ from alternative to normal is made approximately equal to the duration of the periods of transmitter operation. Preferably the times of operation are relatively short, for example, $t_N$, $t_A$ and $t_2$ may each have a duration of about 50 milliseconds while $t_1$ may have a duration of about 10 milliseconds thus giving a total period T of 160 milliseconds corresponding to a recurrence frequency of 62.5 cycles per second.

Figure 3:
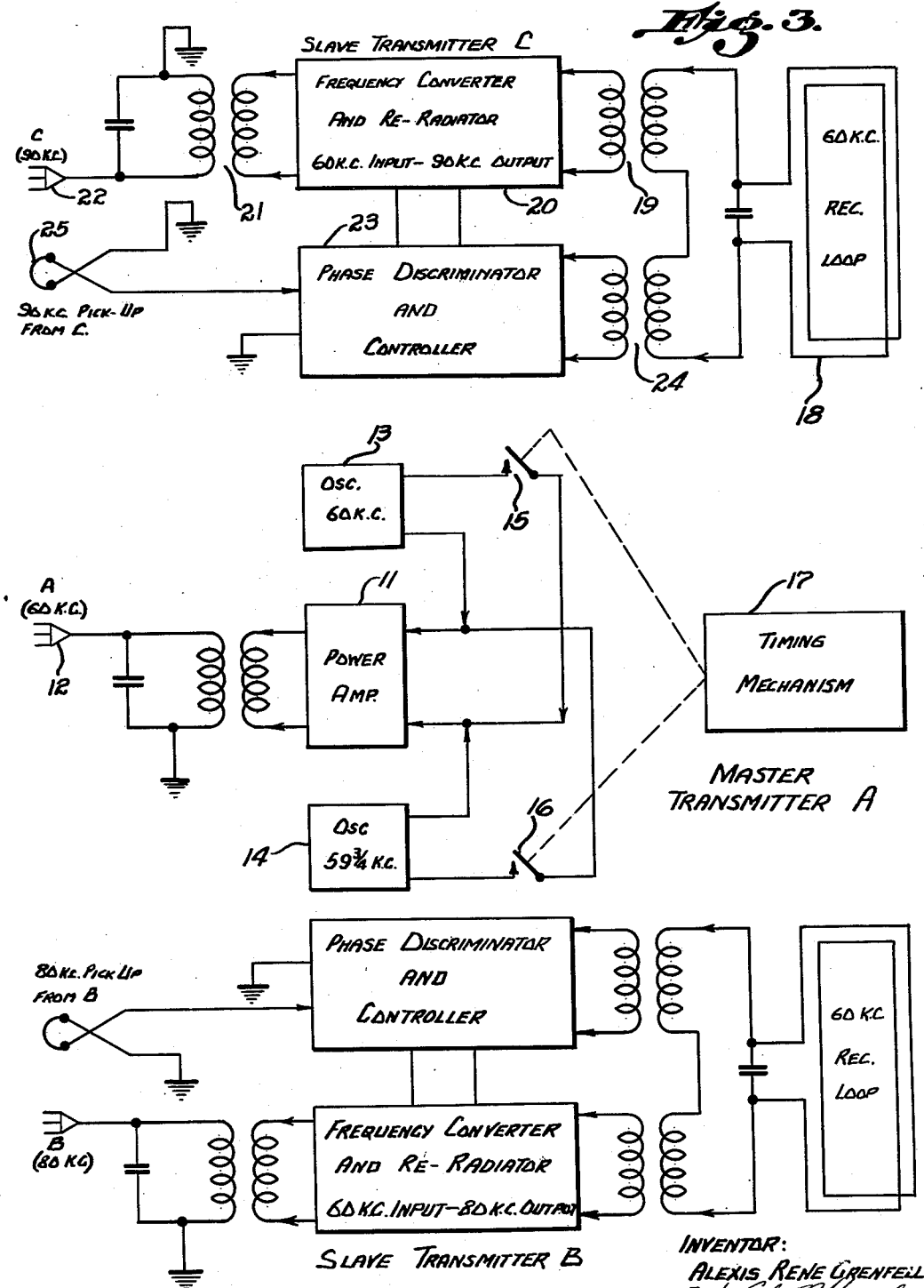
Figure 3 is a block diagram illustrating the transmitting apparatus.

Figure 3 illustrates by means of a block diagram the transmitting apparatus which is placed at locations A, B and C. The transmitter at location A comprises a master transmitter employing a power amplifier 11 feeding an antenna 12 at location A and arranged to be driven alternately from two oscillators 13 and 14 or other suitable sources of radio frequency energy at frequencies of 60 kc. and 59¾ kc. respectively. Oscillators 13 and 14 are each connected to the power amplifier 11 through corresponding switches 15 and 16 which are arranged to be operated alternately by a suitable timing mechanism 17 in such a way as to produce an alternating mode of operation such as has been described with reference to Figure 2.

Each of the transmitters situated at locations B and C are of the slave type and serve to receive signals from the master transmitter at location A and to re-radiate the received signals at a different but harmonically related frequency and in a fixed multiple phase relation. Since the two slave transmitters are identical, only that employed at location C will be described.

The signals radiated from location A are picked up by a receiving aerial 18 which may comprise a loop antenna. The loop is coupled as shown at 19 to a frequency converter and reradiator 20 serving to convert the 60 kc. input into a 90 kc. output. The output from apparatus 20 is coupled as shown at 21 to a transmitting antenna 22 situated at location C. A fixed multiple phase relation between the 90 kc. signals radiated from antenna 22 and 60 kc. signals radiated from antenna 12 is obtained by the use of a phase discriminator and controller 23. This device operates to determine the multiple phase relation between 60 kc. signals picked up by the loop 18 and applied to the apparatus 23 through coupling device 24 and 90 kc. signals picked up by a small pick-up loop 25 situated near the antenna 22. The device 23 serves also to produce a direct control potential the magnitude of which varies in correspondence with any changes in the phase relation determined by the phase discriminator. The variations in control potential are utilised in the apparatus 20 to so operate a phase shifting device as to shift the phase of the radiated 90 kc. signals in such direction and by such amount as to restore the multiple phase relation to the original value.

For a complete description of the slave transmitter equipment reference should be had to the aforementioned co-pending application Serial No. 612,986.

It will be seen that since the signal radiated at location C is the ninth harmonic of the fundamental of which the signal radiated from location A is the sixth harmonic, the change in frequency radiated from location A from 60 kc. to 59¾ kc. is accompanied by a change in radiation from location C from 90 kc. to 89⅝ kc. Similarly while 80 kc. signals are normally radiated from location B the change in master frequency from 60 kc. to 59¾ kc. automatically produces a change to 79⅔ kc. in the frequency radiated from location B.

Figure 4:
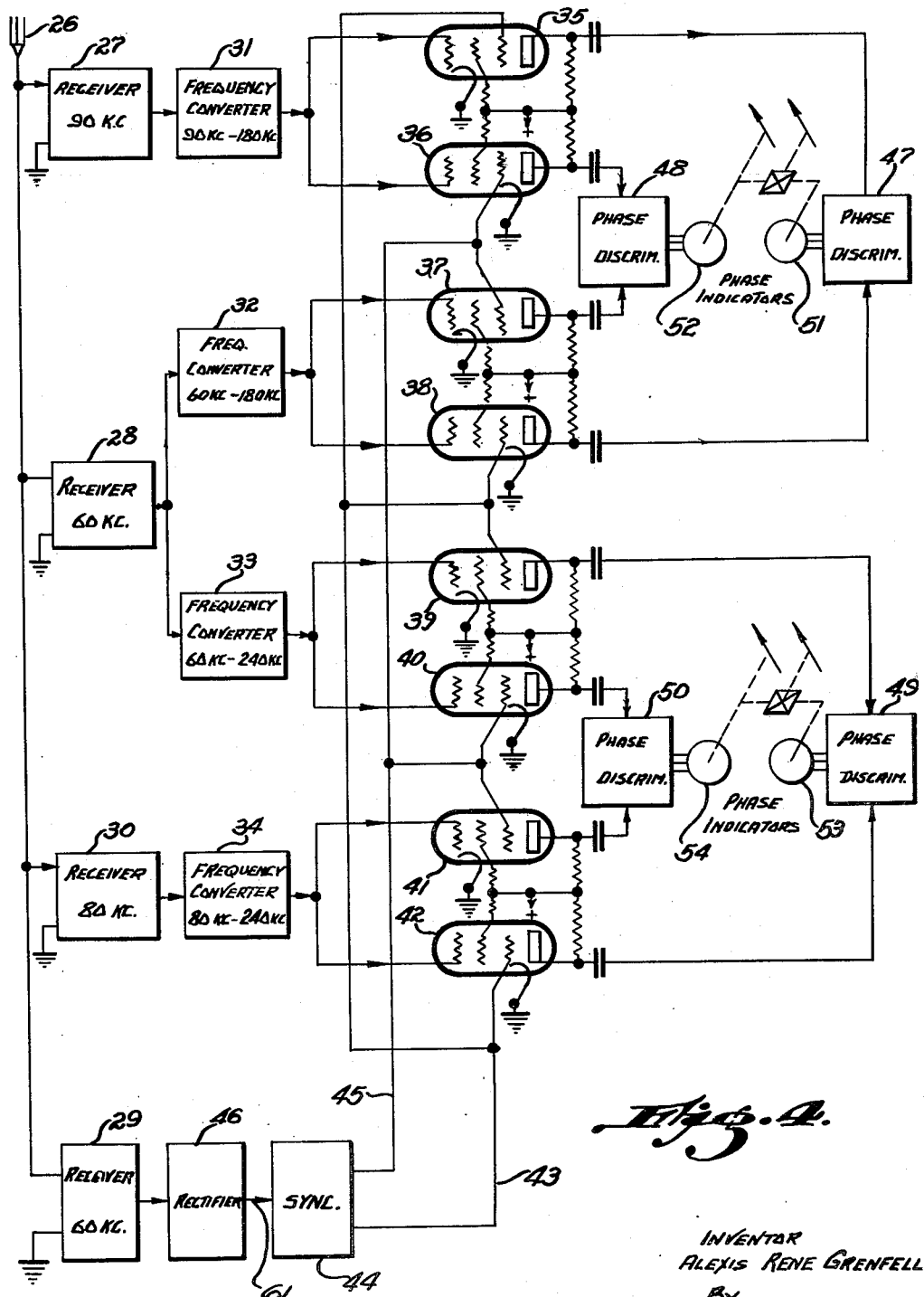
Figure 4 is a block diagram illustrating the receiving apparatus.

There is illustrated in Figure 4 a receiving apparatus which may be used to receive the radiations from the transmitting equipment above described and which operates to simultaneously give a lane identification and precise data as to the location of the receiver within the identified line. The signals radiated from each of locations A, B and C are received on an antenna 26 which is coupled to a 90 kc. receiver 27, two 60 kc. receivers 28 and 29 and an 80 kc. receiver 30. It will be understood that these receivers though normally tuned to the frequencies corresponding to the normal mode of transmitter operation are nevertheless sufficiently broad in their tuning to receive with equal facility the slightly different frequencies which are radiated during the alternative mode of transmitter operation.

The output of receiver 27 is fed to a frequency converter 31 operating to produce an output frequency double the input frequency, that is, 180 kc. during the normal mode of operation and 179¼ kc. during the alternative mode of operation. Similarly the output of receiver 28 is coupled to a frequency converter 32 operating to treble the input frequency so as to produce normal and alternative output frequencies equal to those produced by the frequency converter 31. The output of receiver 28 is also coupled to a frequency converter 33 operating to quadruple the input frequency so as to produce output signals of 240 kc. during the normal mode of transmitter operation and of 239 kc. during the alternative mode. The receiver 30 is coupled to a frequency converter 34 operating to treble the input frequency so as to produce normal and alternative output frequencies equal to the normal and alternative output frequencies produced by the frequency converter 33.

The output of the frequency converter 31 is applied to each of two vacuum tube gate stages 35 and 36. In a similar way the outputs from frequency converters 32, 33 and 34 are each divided and applied to vacuum tube gate circuits 37—38, 39—40, and 41—42. The gate circuits are identical and each may comprise a pentode type of tube. The anodes and screen grids are coupled through suitable coupling devices to a source of positive direct potential indication in Figure 4 by the arrow head bearing the sign +.

The cathode of each tube is grounded and the control grid of each tube is connected to the output of the frequency converter with which each gate circuit is associated. The suppressor grids of the stages 35, 38, 39, and 42 are connected in parallel and by means of a conductor 43 to a synchronizer circuit 44. Similarly, the suppressor grids of gate stages 36, 37, 40 and 41 are connected in parallel and by means of a conductor 45 to the synchronizer 44.

The synchroniser 44 is arranged to be controlled by the output of the receiver 29 which is rectified as by means of a rectifier 46 before being applied to the input of the synchroniser circuit 44. As is explained in detail hereinafter, the synchronizer 44 operates to apply alternately to the conductors 43 and 45 a negative potential of sufficient magnitude to block the operation of the vacuum tubes the suppressor grids of which are connected to the respective conductors. Each of the gate circuits thus operates as a switch which is opened or closed in response to the absence or presence of a negative control potential upon the associated control conductors 43 and 45.

The anode of the gate tube 35 is coupled to one input circuit of a phase discriminator 47, the other input circuit thereof being coupled to the anode of the gate tube 38. Similarly, the anode of the gate tube 36 is coupled to one input circuit of another phase discriminator 48, the other input circuit of which is coupled to the anode of gate tube 37. In a similar way the anode of the gate tubes 39, 40, 41, 42 are coupled to the input circuits of two other phase discriminators 49 and 50.

The phase discriminators 47, 48, 49 and 50 are each operatively connected to phase indicators 51, 52, 53 and 54 and each phase discriminator co-acts with its associated phase indicator in such a way as to cause the rotatable shaft of the phase indicator to assume an angular position which is representative of the phase angle between the two input signals of the phase discriminator. While phase discriminators and phase indicators of any suitable type may be employed a preference is expressed for the phase discriminator circuit which is described in a co-pending application Serial No. 612,991, filed August 27, 1945 by William J. O'Brien Patent No. 2,500,200 granted March 14, 1950 and assigned to the assignee of this application, and a preference is expressed for the phase indicator which is described in a co-pending application Serial No. 612,984, filed August 27, 1945 by William J. O'Brien Patent No. 499,326 granted February 28, 1950 and also assigned to the assignee of this application.

Figure 5:
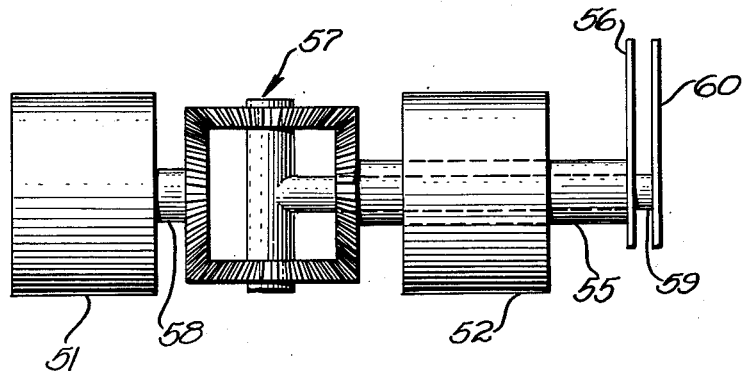
Figure 5 is a diagrammatic representation of the phase indicators used in a receiving apparatus.

As is shown in Figure 5, the phase indicator 52 includes a tubular rotating shaft 55 upon which is mounted a pointer 56 for indicating on a suitable dial or scale the phase relation between the two input signals of the phase discriminator 48, these indications being representative of the location of the vehicle within one lane. The shaft 55 also comprises one input of a differential mechanism 57 the other input 58 of which comprises a rotatable shaft of the phase indicator 51. The third shaft 59 of the differential 57 is extended through the hollow shaft 55 and carries a pointer 60 for indicating on a suitable scale the difference between the angular positions of shafts 55 and 58. This angular position is the phase difference at the location of the receiver between the solid line pattern shown in Figure 1 and the dotted line pattern, so that the position of the pointer 60 comprises an identification of the particular lane within which the receiver is located. A similar differential mechanism is used to inter-connect the phase discriminators 53 and 54 with their pointers and indicating dials.

The receiver 29, rectifier 46 and synchroniser 44 co-act to apply to the conductor 43 a negative potential during the period $t_N$ represented by the block areas 9 on Figure 2, and during the periods $t_A$ represented by the block areas 10 on Figure 2 to apply a negative potential to the control conductor 45. Thus, during periods of normal transmission the discriminators 48 and 50 are operatively connected to the associated receivers by the action of the gate stages 36, 37, 40 and 41. Similarly, during the periods of alternative transmissions the phase discriminators 47 and 49 are operatively connected to the receivers by the action of the gate stages 35, 38, 49 and 42. Thus it will be seen that the phase indicators 52 and 54 are intermittently energised during periods of normal transmission, and that phase indicators 51 and 53 are intermittently energised during the periods of alternative transmission. Since the repetition rate of the alternating transmissions is of the order of magnitude of 60 cycles per second, the inertia of the mechanism associated with the phase indicators will be sufficient to cause the indicators to assume their proper indicating positions as reliably as though they were continuously energised.

Figure 6:
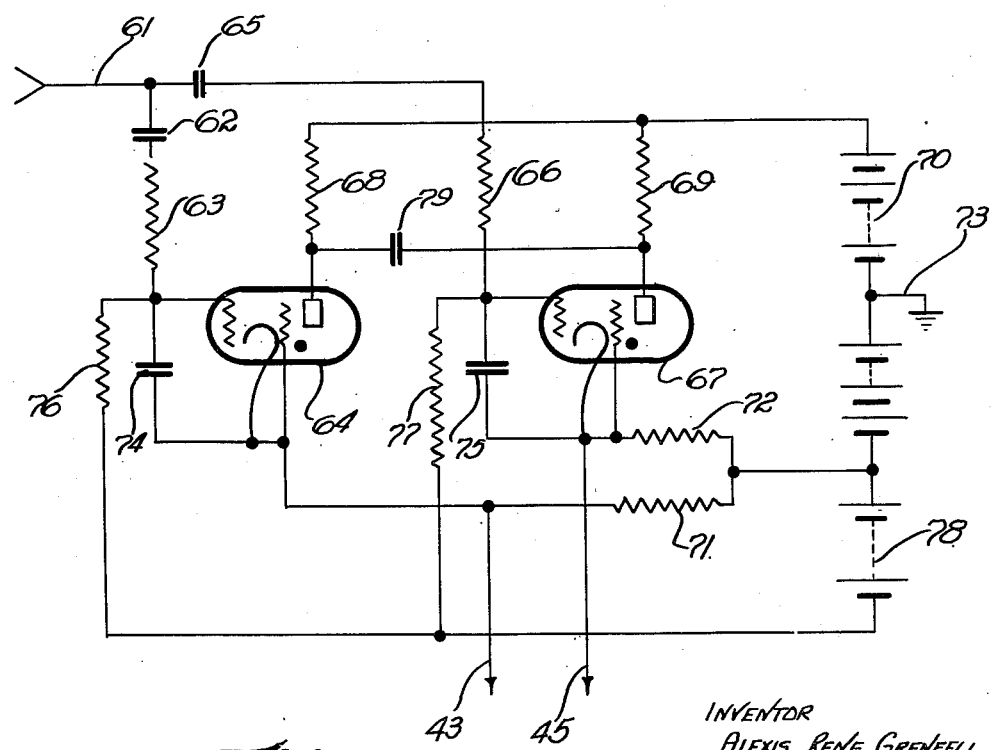
Figure 6 is a wiring diagram illustrating one type of synchroniser circuit which may be employed with the receiving apparatus shown in Figure 4.

There is illustrated in Figure 6 a circuit which may be used for the synchroniser 44. Input conductor 61 comprises the output of the rectifier 46. This conductor is coupled through a condenser 62 and resistance 63 to the control grid of a gas tetrode 64. The input 61 is also coupled through a condenser 65 and resistance 66 to a control grid of another gas tetrode 67. The anodes of each of the tubes 64 and 67 are each coupled through coupling resistances 68 and 69 to a source of positive operating potential such as that represented by the battery 70. The cathodes and screen grids of each of the tubes are inter-connected and coupled to the negative terminal of the battery 70 through cathode coupling resistances 71 and 72. The control conductors 43 and 45 shown on Figure 4 are connected respectively to the cathodes of the tubes 64 and 67. The battery 70 is grounded as indicated at 73 at a point intermediate the ends thereof so that there is normally applied to the cathodes of the tubes 64 and 67 a potential which is negative with respect to ground.

Small by-pass condensers 74 and 75 preferably inter-connect the grid and cathode of each tube, and the control grid of each tube is preferably connected through coupling resistances 76 and 77 to a source of negative bias potential (represented in Figure 6 by the battery 78) the positive terminal of which is connected to the negative terminal of the battery 73. The bias battery 78 serves to normally hold the control grid of each of the tubes 64 and 67 sufficiently negative with respect to the cathode to maintain the tube in a non-conductive condition until the grid potential is shifted in the positive direction by an incoming signal to a point more positive than the critical grid potential of the tube. The anodes of the two tubes are inter-connected through a commutating condenser 79.

The time constant of the resistance 66 and condenser 75 is made sufficiently long to prevent the grid potential of the tube 67 from rising to the critical value upon the application to the conductor 61 of a short positive pulse but such that the grid potential will exceed the critical value when a positive pulse of long duration is applied to the conductor 67. The time constant of the resistance 63 and condenser 74 is made sufficiently short to cause the tube 64 to conduct upon either a short pulse or a long pulse.

The radio frequency signals which are applied to the input of the receiver 29 have a time sequence such as is represented in Figure 2. When these signals are rectified by the rectifier 46 the direct current output of the rectifier is exactly represented by the graph of Figure 2. The rectifier 46 includes also a D. C. restoring circuit of conventional construction so that the signal which is applied to the conductor 61 comprises a short positive pulse corresponding to the time $t_1$ shown on Figure 2 followed by a long positive pulse corresponding to the time $t_2$ shown on Figure 2.

When the short pulse is applied to conductor 61, tube 64 is caused to conduct, thereby causing the cathode to be shifted in the positive direction to bring the conductor 43 substantially up to ground potential. Since the tube 67 does not fire upon the short pulse the conductor 45 remains at cathode potential which by reason of the grounding of the battery 70 intermediate its ends is negative with respect to ground. Upon the application of the long positive pulse to the conductor 61 the tube 67 becomes conductive and by reason of the commutating condenser 79 stops the conduction of tube 64. Therefore upon receipt of a long positive pulse conductor 45 is shifted in the positive direction to substantially ground potential while conductor 43 shifts in the negative direction to a value sufficient to operate the gate tubes shown in Figure 4. When the next short negative pulse is applied to conductor 61, tube 64 is rendered conductive and conduction of tube 67 is stopped so as to restore the negative potential to conductor 45 while shifting conductor 43 substantially to ground potential.

It will be noted that the use of the selected time constants for the input circuits of tubes 64 and 67 together with the short and long pulses corresponding to the times $t_1$ and $t_2$ ensures that the receiver is properly synchronised with the transmissions so that the phase indicators 52 and 54 are energised during the periods of normal transmission and so that the phase indicators 51 and 53 are energised during the periods of alternative transmission.

From the foregoing it will be seen that there has been provided a radio navigational system in which the mode of operation of the transmitters is alternated between two different modes establishing two similar but unlike navigational patterns, and that there has been provided a receiving apparatus for receiving the transmitted signals together with means operating in an alternate fashion in synchronism with the alternations of the transmitting system to connect each set of phase indicators in circuit at the times the transmitting system is radiating the signals intended for those phase indicators. The described method of inter-connecting the two phase indicators serves to provide upon a single dial a continuous indication of the lane within which a mobile vehicle is located concurrently with the precise location of the receiver within the thus identified lane.

While there has been shown and described the preferred embodiment of this invention, the same is not to be limited to the details of construction shown and described herein, except as defined in the appended claims.

I claim:

1. In a radio frequency navigational aid, the combination of: radio frequency transmitting means for radiating signals alternately establishing in repeating time cycles a normal and an alternative radio frequency field pattern of equi-phase displacement field contours, said normal pattern defining a given number of lanes and said alternative pattern defining a different number of lanes, said patterns being identically oriented in space; radio frequency receiving means for receiving said signals; two phase indicators operatively connected to said receiving means, one for said normal pattern and one for said alternative pattern; and switching means for rendering said indicators alternately operable in synchronism with said repeating time cycles.

2. In a radio frequency navigational aid, the combination of: radio frequency transmitting means for radiating signals alternately establishing in repeating time cycles a normal and an alternative radio frequency field pattern of equi-phase displacement field contours, said normal pattern defining a given number of lanes and said alternative pattern defining a different number of lanes, said patterns being identically oriented in space; radio frequency receiving means for receiving said signals; two phase measuring means operatively connected to said receiving means, one for measuring the phase relations among the signals of said normal pattern, and the other for measuring the phase relations among the signals of said alternative pattern; switching means for rendering said two phase measuring means alternately operable in synchronism with said repeating time cycles; means for indicating the phase relations measured by one of said phase measuring means; and means for indicating the difference between the phase relations measured by said two phase measuring means.

3. In a radio frequency navigational aid, the combination of: radio frequency transmitting means for radiating signals alternately establishing in repeating time cycles a normal and an alternative radio frequency field pattern of equi-phase displacement field contours, said normal pattern defining a given number of lanes and said alternative pattern defining a different number of lanes, said patterns being identically oriented in space; radio frequency receiving means for receiving said signals; two phase measuring means operatively connected to said receiving means, one for measuring the phase relations among the signals of said normal pattern, and the other for measuring the phase relations among the signals of said alternative pattern; switching means for rendering said two phase measuring means alternately operable in synchronism with said repeating time cycles; means for indicating the phase relations measured by one of said phase measuring means; and means including a differential mechanism connected between said two phase measuring means for indicating the difference between the phase relations measured by said two phase measuring means.

4. For use with a radio navigational aid transmitting system operating to radiate alternately in repeating time cycles two sets of radio frequency signals, each set comprising signals of unlike but harmonically related frequencies bearing a fixed multiple phase relation to each other, the signals of one of said sets differing slightly in frequency from the corresponding signals of the other set, to establish a normal and an alternative radio frequency field pattern of equi-phase displacement field contours, said normal pattern defining a given number of lanes and said alternative pattern defining a different number of lanes, said patterns being identically oriented in space, a receiving apparatus comprising means for receiving each of said sets of signals; two phase measuring means operatively connected to said means for receiving for separately measuring the phase relations among the signals of each set; and means for rendering said two phase measuring means alternately operable in a repeating time cycle in synchronism with the alternate operation of said transmitting system.

5. For use with a radio navigational aid transmitting system operating to radiate alternately in repeating time cycles two sets of radio frequency signals, each set comprising signals of unlike but harmonically related frequencies bearing a fixed multiple phase relation to each other, the signals of one of said sets differing slightly in frequency from the corresponding signals of the other set, to establish a normal and an alternative radio frequency field pattern of equi-phase displacement field contours, said normal pattern defining a given number of lanes and said alternative pattern defining a different number of lanes, said patterns being identically oriented in space, a receiving apparatus comprising means for receiving each of said sets of signals; two phase measuring means operatively connected to said means for receiving for separately measuring the phase relations among the signals of each set; and means responsive to the alternations of said transmitting system for rendering said two phase measuring means alternately operable in a repeating time cycle in synchronism with the alternate operation of said transmitting system.

6. For use with a radio navigational aid transmitting system operating to radiate alternately in repeating time cycles two sets of radio frequency signals, each set comprising signals of unlike but harmonically related frequencies bearing a fixed multiple phase relation to each other, the signals of one of said sets differing slightly in frequency from the corresponding signals of the other set, to establish a normal and an alternative radio frequency field pattern of equiphase displacement field contours, said normal pattern defining a given number of lanes and said alternative pattern defining a different number of lanes, said patterns being identically oriented in space, a receiving apparatus comprising means for receiving each of said sets of signals; two phase measuring means operatively connected to said means for receiving for separately measuring the phase relations among the signals of each set; means for rendering said two phase measuring means alternately operable in a repeating time cycle in synchronism with the alternate operation of said transmitting system; two indicating means; means directly connecting one of said indicating means to one of said phase measuring means for directly indicating the phase relations among the signals of said one set; and differential means connecting the other of said indicating means to both of said phase measuring means for indicating the difference between the phase relations of said two sets of signals.

7. In a radio receiving apparatus, the combination of: means for receiving two sets of radio frequency signals, each set comprising signals of unlike but related frequencies bearing a fixed multiple phase relation to each other, the signals of one set differing slightly in frequency from the corresponding signals of the other set, and said sets of signals being produced alternately in a repeating time cycle; two phase measuring means; gate circuit means connecting each phase measuring means to said receiver and including control means responsive to the application thereto of a control potential for operatively opening said circuit; synchronizing means connected to said receiving means for producing two separate control potentials, one during the reception of the signals of said one set and the other during the production of signals of said other set; and means for applying said control potentials to said control means.

ALEXIS RENÉ GRENFELL.

REFERENCES CITED

The following references are of record in the file of this patent:

UNITED STATES PATENTS

| Number    | Name     | Date          |
|-----------|----------|---------------|
| 1,942,262 | Shanklin | Jan. 2, 1934  |
| 2,144,203 | Shanklin | Jan. 17, 1939 |
| 2,324,314 | Michel   | July 13, 1943 |
| 2,408,773 | Goodall  | Oct. 8, 1946  |
| 2,426,454 | Johnson  | Aug. 26, 1947 |
| 2,440,755 | O'Brien  | May 4, 1948   |